US009278840B2

(12) United States Patent
Hess et al.

(10) Patent No.: US 9,278,840 B2
(45) Date of Patent: Mar. 8, 2016

(54) PALLETIZING MOBILE DRIVE UNITS

(71) Applicant: Amazon Technologies, Inc., Reno, NV (US)

(72) Inventors: Peter Martin Hess, Danvers, MA (US); Scot Douglas Davis, Wilmington, MA (US); Stephen Aquilino, Salem, NH (US)

(73) Assignee: Amazon Technologies, Inc., Reno, NV (US)

( * ) Notice: Subject to any disclaimer, the term of this patent is extended or adjusted under 35 U.S.C. 154(b) by 32 days.

(21) Appl. No.: 14/311,891

(22) Filed: Jun. 23, 2014

(65) Prior Publication Data

US 2015/0368078 A1 Dec. 24, 2015

(51) Int. Cl.
*B65D 19/00* (2006.01)
*B66F 9/06* (2006.01)

(52) U.S. Cl.
CPC .................. *B66F 9/063* (2013.01); *B65D 19/00* (2013.01)

(58) Field of Classification Search
CPC .......... B66F 9/063; B65D 19/38; B65D 19/00
USPC ........................................................ 414/286
See application file for complete search history.

(56) References Cited

U.S. PATENT DOCUMENTS

| 4,571,141 A | 2/1986 | Gieson et al. | |
|---|---|---|---|
| 8,256,615 B2* | 9/2012 | Goda ..................... | B65D 19/06 108/55.1 |
| 8,280,547 B2 | 10/2012 | D'Andrea et al. | |
| 9,008,828 B2* | 4/2015 | Worsley ............... | G06Q 10/087 700/213 |
| 9,075,412 B2* | 7/2015 | Dixon .................... | G05D 1/0022 |
| 2007/0140817 A1* | 6/2007 | Hansl ...................... | B66F 9/063 414/277 |
| 2012/0143427 A1 | 6/2012 | Hoffman et al. | |
| 2013/0190963 A1* | 7/2013 | Kuss ....................... | B66F 9/063 701/23 |
| 2013/0302132 A1* | 11/2013 | D'Andrea .............. | G06Q 10/08 414/807 |
| 2014/0074341 A1* | 3/2014 | Weiss ...................... | B66F 9/063 701/25 |
| 2014/0228999 A1* | 8/2014 | D'Andrea ............... | B66F 9/063 700/214 |
| 2015/0073589 A1* | 3/2015 | Khodl ...................... | B25J 5/007 700/218 |

FOREIGN PATENT DOCUMENTS

| DE | 202010010624 | 11/2010 |
|---|---|---|
| DE | 102009049563 | 4/2011 |
| GB | 2273281 | 6/1994 |

OTHER PUBLICATIONS

PCT/US2015/037012, "International Search Report and written opinion", mailed Oct. 22, 2015, 10 pages.

* cited by examiner

*Primary Examiner* — Gene Crawford
*Assistant Examiner* — Thomas Randazzo
(74) *Attorney, Agent, or Firm* — Kilpatrick Townsend & Stockton LLP

(57) ABSTRACT

An inventory system includes a pallet and a base for palletizing or unpalletizing a mobile drive unit. The pallet has a set of openings corresponding with features of the mobile drive unit. The mobile drive unit features may extend into the pallet openings. The base includes protrusions corresponding to the pallet openings. Engaging the pallet and base can position the base protrusions in the pallet openings. Positioning the base protrusions in the pallet openings can displace the mobile drive unit features from the pallet openings and/or provide a surface upon which the mobile drive unit can navigate.

20 Claims, 11 Drawing Sheets

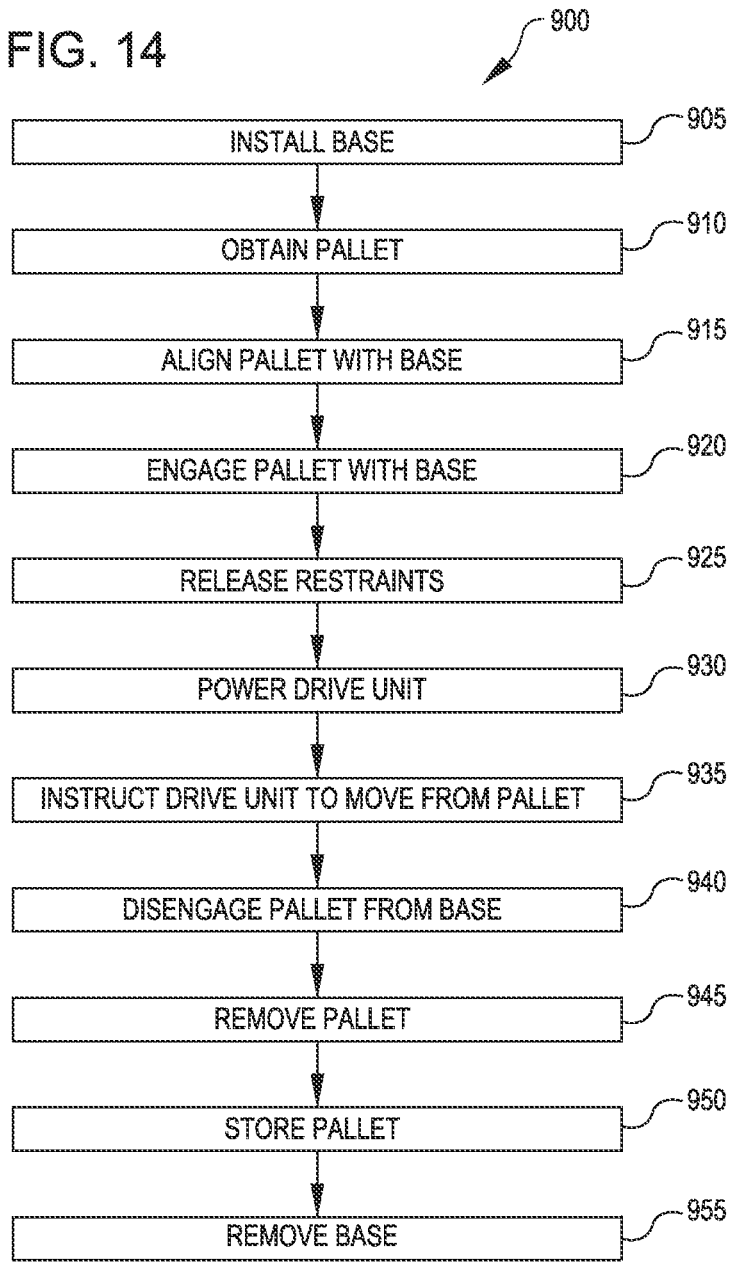

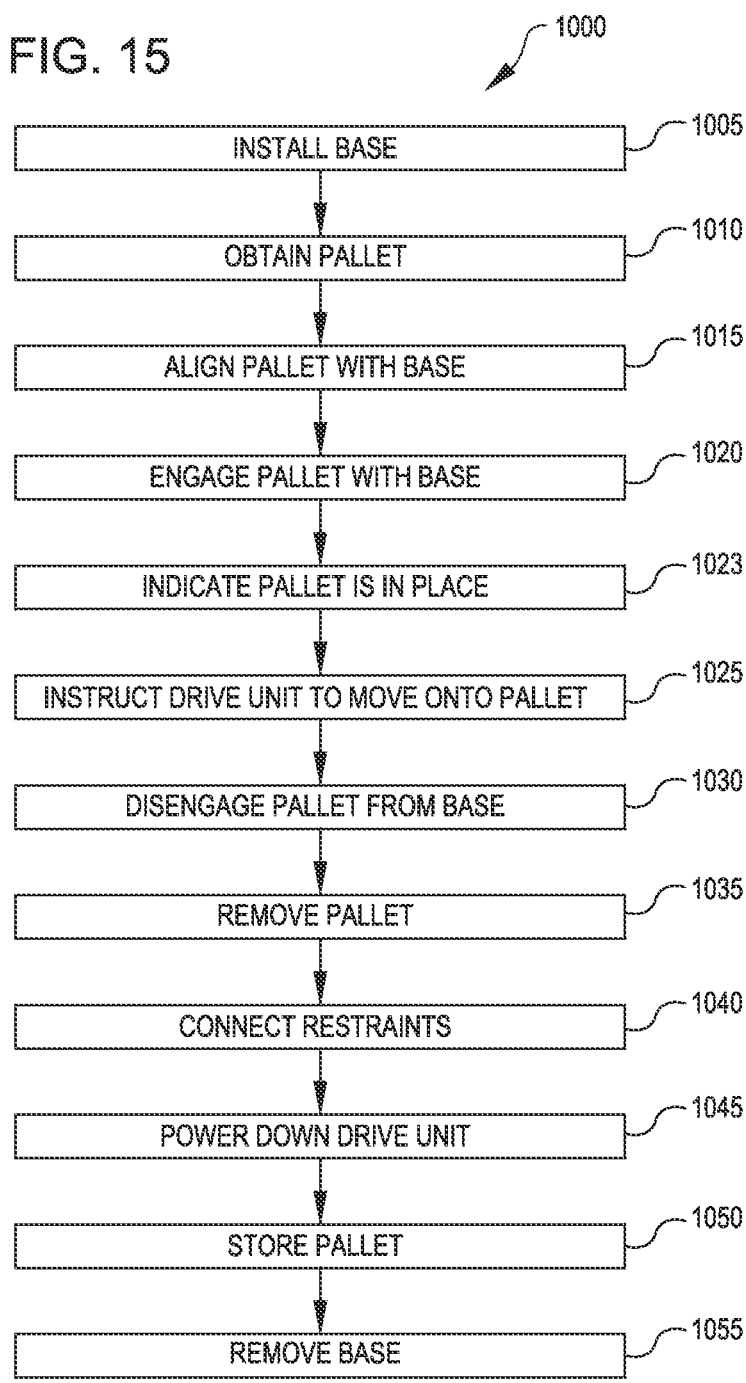

PALLETIZING MOBILE DRIVE UNITS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which:

FIG. 14 is a flowchart illustrating a process of unloading mobile drive units from pallets according to a particular embodiment;

FIG. 15 illustrates a flowchart illustrating a process for loading mobile drive units onto pallets according to a particular embodiment.

DETAILED DESCRIPTION

Figure 1:
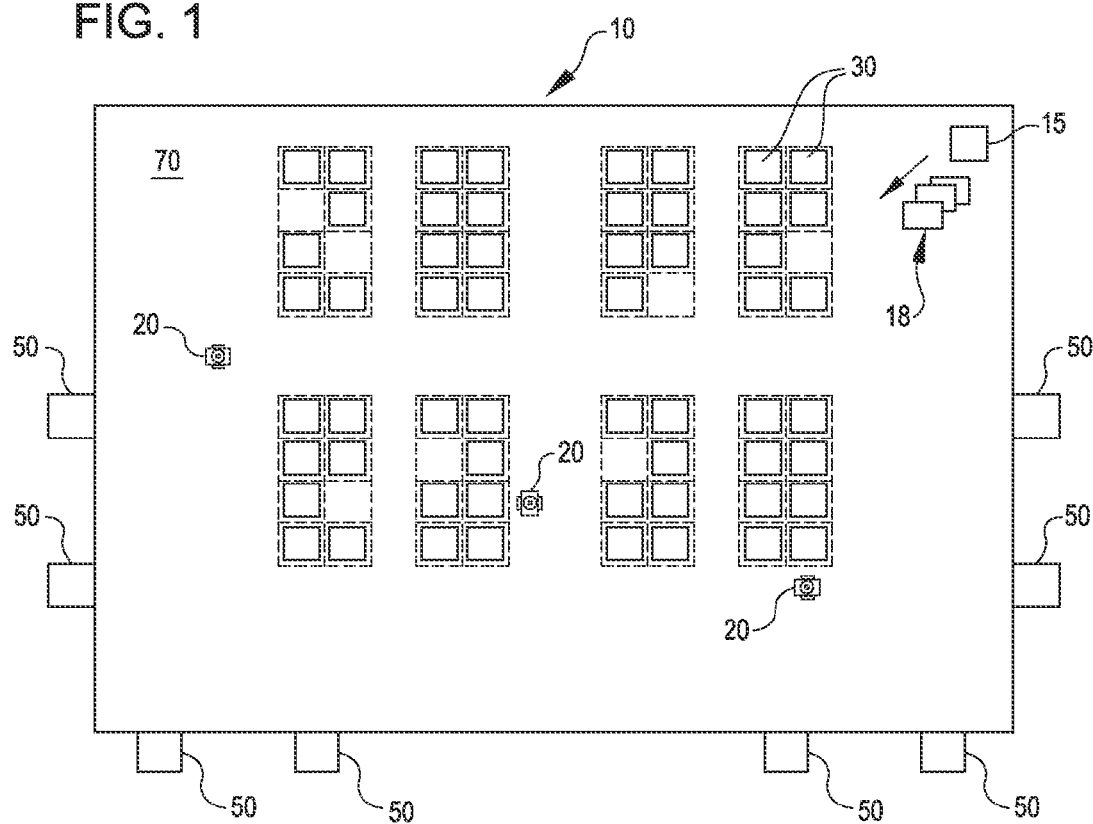
FIG. 1 illustrates components of an inventory system according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. Specifically, features herein are directed to palletizing and/or unpalletizing mobile drive units, such as for loading or unloading mobile drive units with respect to shipping the mobile drive units from one location to another. To this end, the inventory system may include pallets, bases, and ramps to facilitate the palletizing process.

In accordance with an embodiment, a pallet can have a set of openings defined through the pallet. The openings can be arranged to correspond with wheels or other features that extend below a bottom surface of a mobile drive unit. During shipping, the wheels or other features may extend into the openings and allow the body of the mobile drive unit to rest on a support surface of the pallet. A base corresponding to the pallet can include a number of protrusions arranged to match the set of openings in or through the pallet. When the pallet is placed on the base, the protrusions can extend through the openings and displace the wheels or other features that were in the openings during shipment. The shape of the protrusions can match the shape of the openings such that the top of the protrusions form a combined surface with the top surface of the pallet. This combined surface may be smooth, consistent, or continuous enough to allow the mobile drive unit to drive or navigate on the combined surface without features of the mobile drive unit catching in the openings of the pallet. In one example the mobile drive unit can drive off of the pallet and down a ramp in order to join other mobile drive units in an inventory system. In another example, the same or a different mobile drive unit can drive up the ramp onto the same or a different pallet and navigate upon the combined surface of the pallet and the base protrusions. The mobile drive unit can navigate into a position in which the wheels and/or other features extending below the bottom surface of the mobile drive unit are aligned over the protrusions. The pallet can be disengaged from the base to allow the wheels and/or other features of the mobile drive unit to extend into the openings of the pallet as the protrusions are withdrawn from the openings.

Referring now to the drawings, in which features that are identified by differing reference numerals across different drawings but share common names in the description herein may refer to features that may or may not differ across embodiments, FIG. 1 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 1 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 2.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 3 and 4.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 1 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 1 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 2:
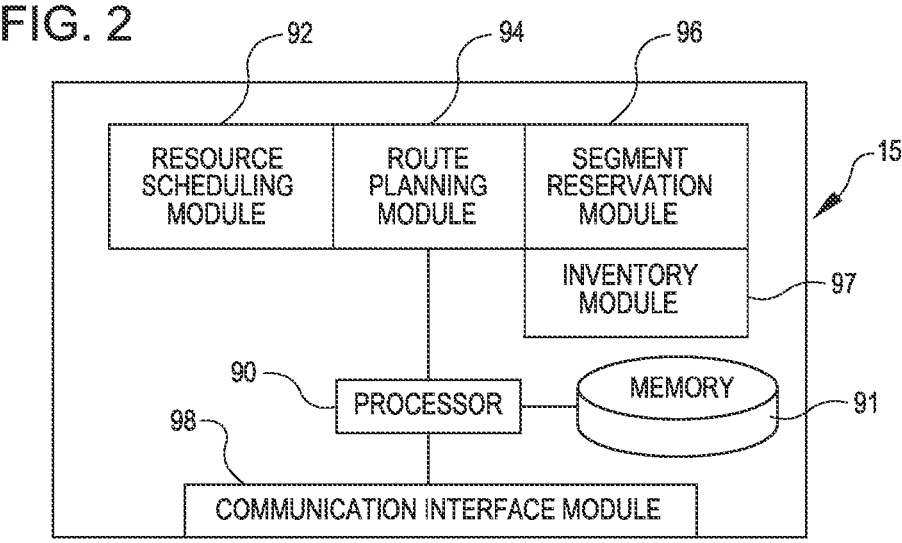
FIG. 2 illustrates in greater detail the components of an example management module that may be utilized in particular embodiments of the inventory system shown in FIG. 1.

FIG. 2 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or non-volatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 3:
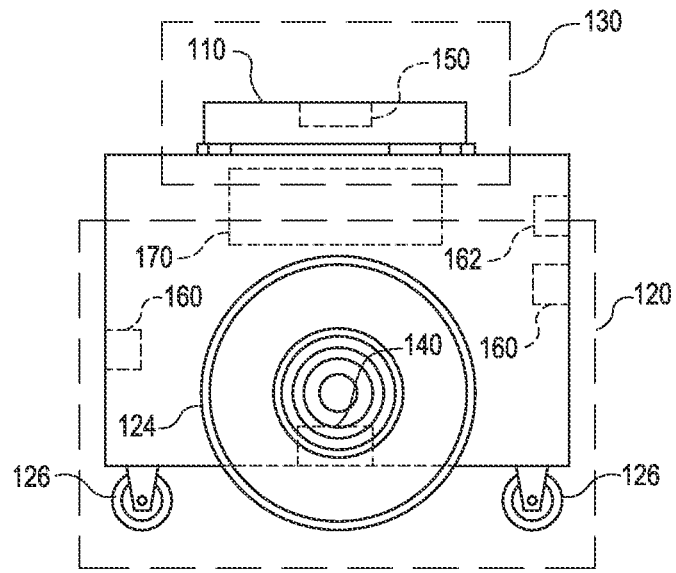
FIGS. 3 and 4 illustrate in greater detail an example mobile drive unit that may be utilized in particular embodiments of the inventory system shown in FIG. 1.
Figure 4:
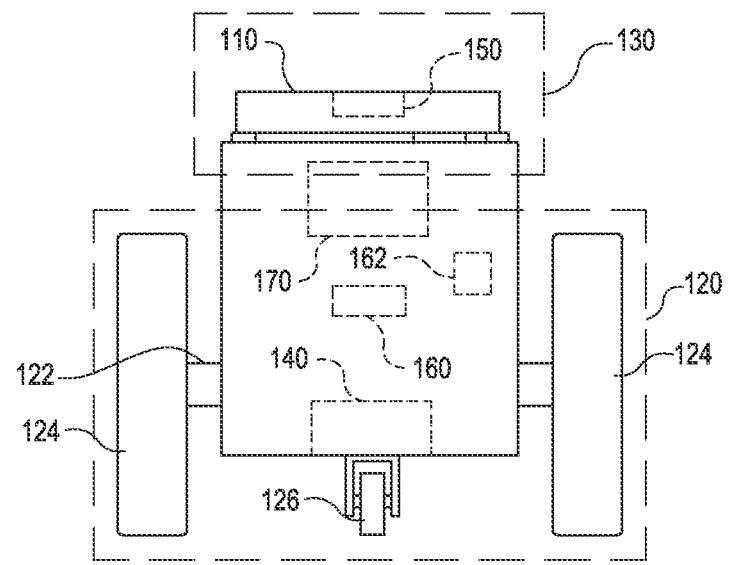

FIGS. 3 and 4 illustrate in greater detail the components of a particular embodiment of mobile drive unit 20. In particular, FIGS. 3 and 4 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel drive module 120. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speed from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 3 and 4 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 5:
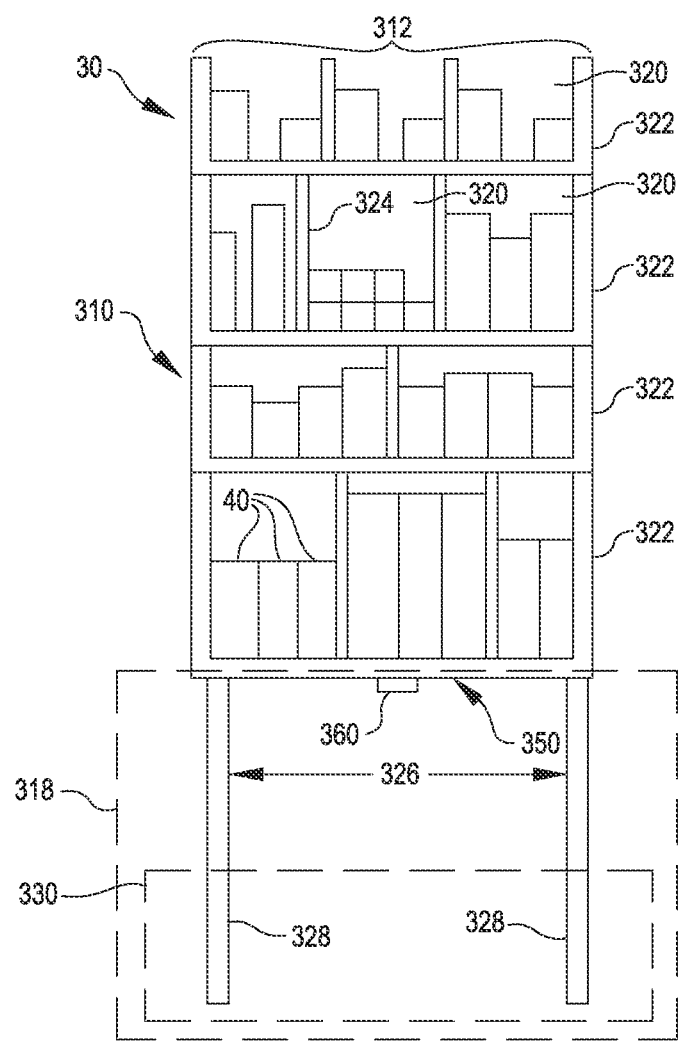
FIG. 5 illustrates in greater detail an example inventory holder that may be utilized in particular embodiments of the inventory system shown in FIG. 1.

FIG. 5 illustrates in greater detail the components of a particular embodiment of inventory holder 30. In particular, FIG. 5 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks 450. Mobile drive unit 20 may be configured to detect fiducial marks 450 and to determine the location of mobile drive unit 20 and/or measure its movement based on the detection of fiducial marks 450.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 40. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to palletizing and/or unpalletizing mobile drive units 20. In accordance with some embodiments the mobile drive units 20 can be given a task assignment 18 to drive onto or off of a pallet. Using the capability of the mobile drive unit 20 to move the mobile drive unit 20 onto or off of a pallet may significantly reduce an amount of ergonomically undesirable physical labor that might otherwise be performed by human workers to move the mobile drive unit onto or off of a pallet, such as for shipping. However, features described herein may also be utilized to palletize and/or unpalletize mobile drive units 20 using physical labor rather than the self-propelling capability of a mobile drive unit 20, such as in instances when operating the mobile drive unit 20 may be impractical. Systems and techniques disclosed herein for palletizing mobile drive units 20 may also decrease complexity and/or an amount of time involved in packing or unpacking mobile drive units 20 for shipping or other functions.

Figure 6:
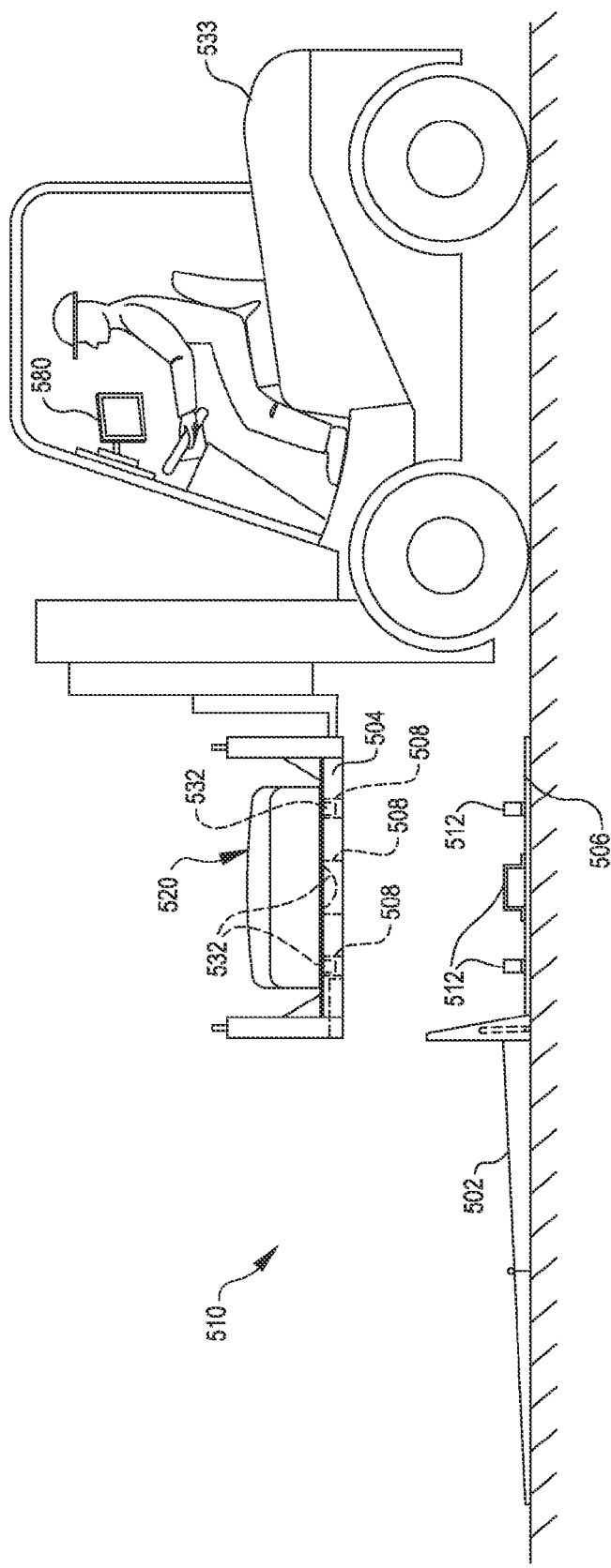
FIG. 6 illustrates a pallet and corresponding base in a separate configuration according to a particular embodiment.

FIG. 6 illustrates an example of an inventory system 510 having a pallet 504 and a corresponding base 506. The pallet 504 may include one or more openings 508 defined through the pallet 504. The openings 508 may be arranged to accommodate features 532 of a mobile drive unit 520. The features 532 may include features extending from the mobile drive unit 520 such as the motorized axle 122, the motorized wheel 124 and/or the stabilizing wheel 126 as described above with respect to FIGS. 3 and 4. The features 532 may extend below a bottom surface 514 of the mobile drive unit 520. The features 532 may extend into the openings 508 when the mobile drive unit 520 is arranged to be supported by the pallet 504, such as for shipment on the pallet 504.

The base 506 may include protrusions 512. The protrusions 512 can be arranged to correspond with the arrangement of the openings 508 of the pallet 504. The base 506 can be installed to a floor of a warehouse or other location associated with the inventory system 510. A ramp 502 may be provided with the base 506. The pallet 504 can be navigated toward the base 506 by a forklift 533, or by any other suitable means for moving the pallet 504. The pallet 504 can be lowered onto the base 506 so as to engage with the base 506.

Figure 7:
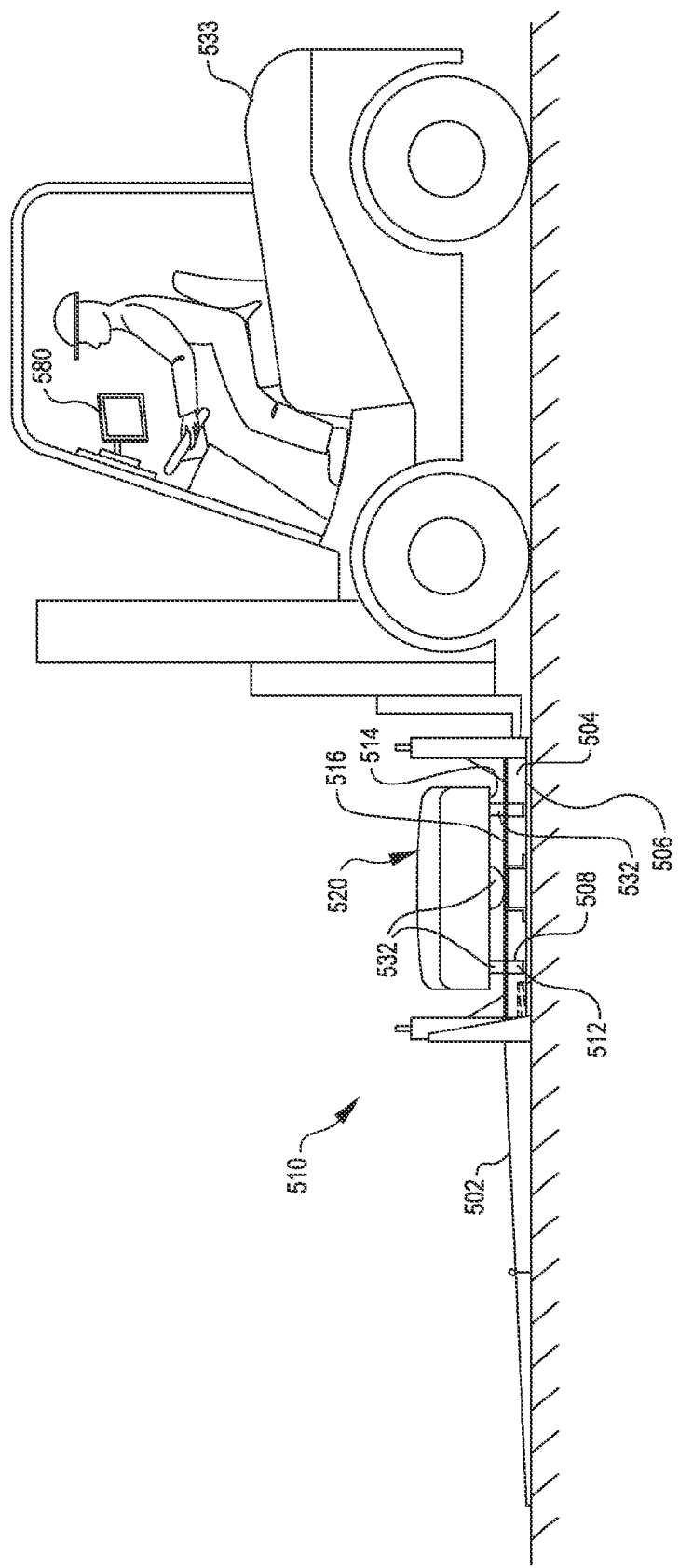
FIG. 7 illustrates the pallet and corresponding base of FIG. 6 in an engaged configuration according to a particular embodiment.

FIG. 7 illustrates the pallet 504 in an engaged configuration with the base 506. In the engaged configuration the protrusions 512 of the base 506 can engage in and/or occupy the openings 508 of the pallet 504. The placement of the protrusions 512 in the openings 508 can displace the features 532 of the mobile drive unit 520 from the openings 508 of the pallet 504. Displacing the features 532 of the mobile drive unit 520 can cause the bottom surface 514 of the mobile drive unit 520 to separate from the support surface 516 of the pallet 504. The ends of the protrusions 512 of the base 506 may be substantially flush with the support surface 516 of the pallet 504 when the pallet 504 and the base 506 are in the engaged configuration. The ends of the protrusions 512 and the support surface 516 may provide a combined surface navigable by the mobile drive unit 520. For example, the mobile drive unit 520 may use the features 532, e.g., wheels and axles, that were displaced from the openings 508 in order to drive upon the combined surface, move off of the pallet 504, and travel down the ramp 502.

Figure 8:
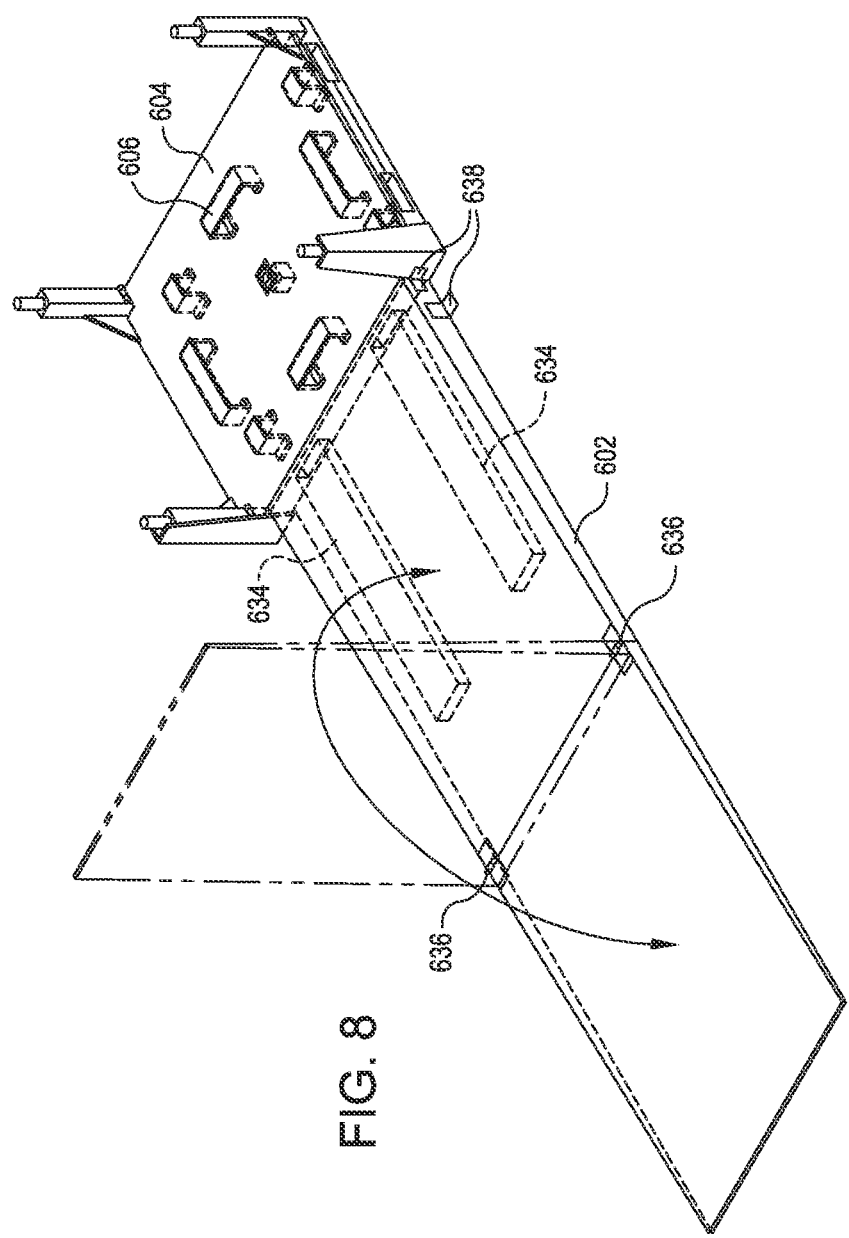
FIG. 8 illustrates an example of a ramp that may be utilized according to a particular embodiment.

FIG. 8 illustrates an example of a ramp 602 that may be utilized with a pallet 604 and corresponding base 606. The ramp 602 may be constructed of any suitable material. In an embodiment, the ramp includes diamond plate steel material decking. The ramp 602 may include features to facilitate installation, removal, and/or shipment of the ramp 602. For example, the ramp may include one or more hinges 636 so that the ramp can be folded and take up less space when being shipped. The ramp may also include fork channels 634 to facilitate movement of the ramp, such as by the forklift 533 depicted in FIG. 5. The ramp 602 may include features to stabilize the ramp 602. For example, the ramp 602 can attach to other structures in any suitable manner, such as to the base 606 or a floor via bolts through one or more angled joints 638.

Figure 9:
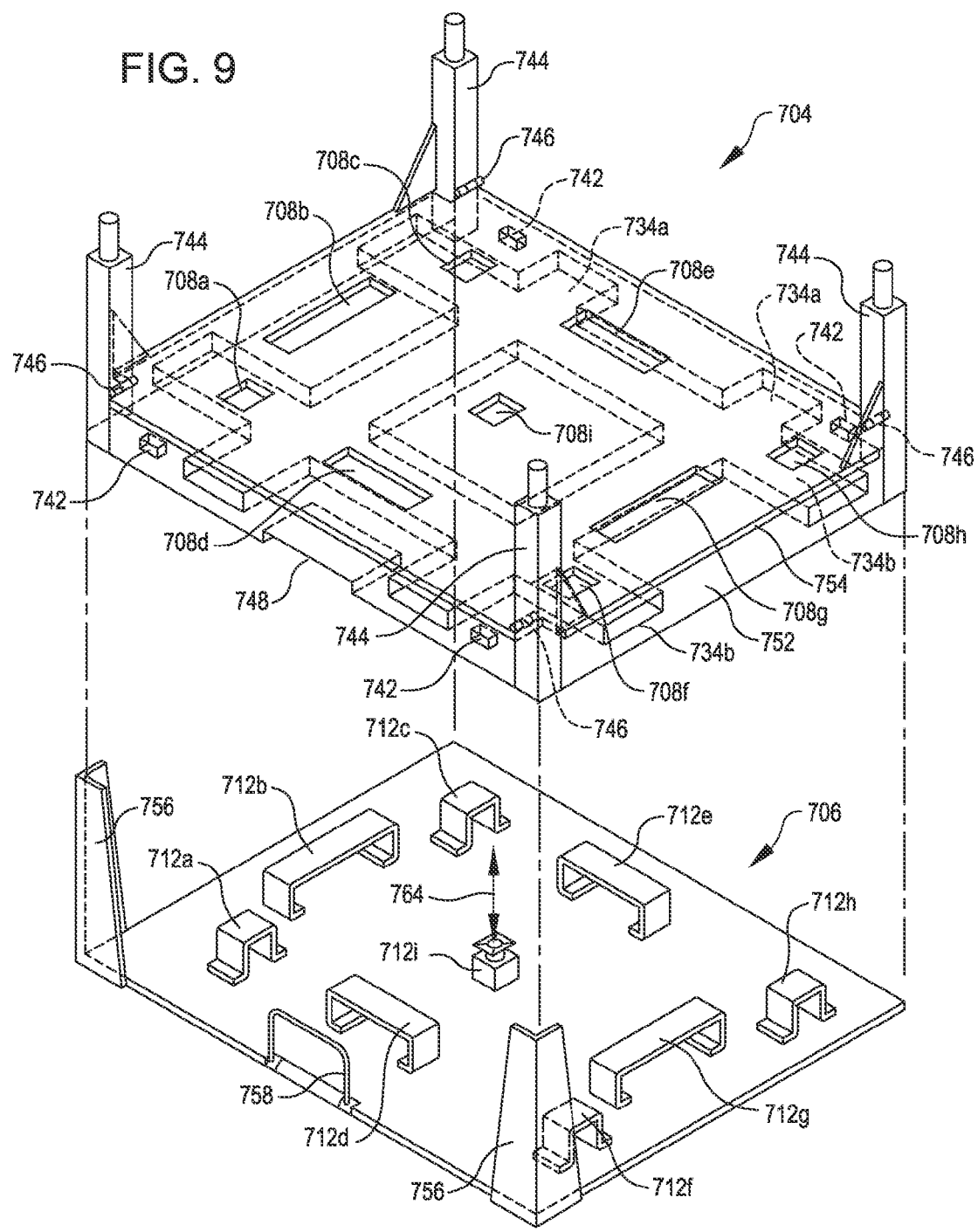
FIG. 9 illustrates in greater detail an example pallet and base according to a particular embodiment.

FIG. 9 illustrates in greater detail an example of a pallet 704 and corresponding base 706 according to a particular embodiment. The pallet 704 can include a number of openings 708 (e.g., openings 708a-708i identified in FIG. 9). The openings 708 can extend through the pallet 704. For example, the openings 708 can extend from a top surface through a bottom surface of the pallet 704. Some or all of the openings 708 can be arranged to accommodate features of a mobile drive unit, such as features 532 described with respect to FIG. 6. In some embodiments, the pallet 704 may also include recesses 742 to accommodate belts or restraints used to secure a mobile drive unit to the pallet 704.

The pallet 704 may include one or more sets of fork channels 734a and 734b to facilitate accessing or carrying the pallet from one or more directions. For example, one set of fork channels 734a can run between a front and a back of the pallet 704, and a second set of fork pockets 734b can run between a left side and a right side of the pallet 704.

The pallet 704 may include posts 744. The posts 744 maybe be positioned so as to support another pallet over the pallet 704 (such as may be appreciated more fully by reference to FIG. 12 and the accompanying description herein). The posts 744 may include hinges 746 or other mechanisms suitable to allow the posts 746 to move from an upright supporting position to a storage position (such as may be appreciated more fully by reference to FIGS. 11 and 13 and the accompanying description herein).

The pallet 704 may include a support layer 754 attached to a frame 752. The frame 752 may include the fork channels 734a, 734b and/or the posts 744. The openings 708 may be cut in the support layer 754, as well as at least portions of the frame 752 that may cover openings 708 in the support layer 754. In some embodiments, the support layer 754 is configured to be removable from the frame 752. Such an arrangement may allow a pallet 704 to be modified easily to accommodate a different style or type of mobile drive unit. For example, a removable support layer 754 may be replaced with a different support layer 754 having a different configuration of openings 708 arranged to accommodate a different mobile drive unit. The support layer 754 and the frame 752 may be formed of any suitable material, but in a particular embodiment, a wood support layer 754 attached to a metal frame 752 is utilized. Metal for the frame may provide improved durability for portions of the pallet 704 that may be subjected to impact or significant loads (such as the fork channels 734a, 734b and/or the posts 744). Forming the support layer 754 from wood may yield a lighter total weight for the pallet 704, which may in turn reduce shipping expenses. Additionally, wood may be easier to cut when forming openings 708 and may be less costly to replace than other materials, thereby further reducing costs over a lifetime of the pallet 704.

The base 706 can include a number of protrusions 712 (e.g., protrusions 712a-712i identified in FIG. 9) arranged in a pattern corresponding to the arrangement of the openings 708 in the pallet 704, or the support layer 754 of pallet 704. The base 706 may also include one or more guides 756. For example, the guides 756 can be positioned at a front end of the base 706 to provide a surface against which posts 744 of the pallet 704 can be aligned when installing the pallet 704 on the base 706. Although depicted as upright in FIG. 9, the guides 756 may alternatively be angled, for example, so as to further direct the pallet 704 into place on the base 706 as the pallet 704 is lowered. In some aspects, the guides 756 may be foldable or otherwise retractable so as to reduce a shipping size of the base. In such cases, the guides can be erected upon installing the base.

Additionally, although description herein primarily refers to engagement of the protrusions 712 with the openings 708 as occurring as a result of lowering the pallet 704 onto the base 706, in some embodiments, some portion of the base 706 may instead or additionally be raised toward the pallet 704. For example, one or more of the protrusions 712 may be raised into one or more openings 708 in the pallet 704. In some embodiments, one or more protrusions 712 may include an actuator or other mechanism to raise and/or lower the protrusions 712, as illustrated by the arrow 764 in FIG. 9. For example, actuation of a protrusion 712 may allow the protrusion 712 to individually or selectively be raised or lowered into an opening 708 of the pallet 704. Selective engagement of a protrusion 712 with an opening 708 in the pallet 704 can facilitate other functions. For example, actuating a protrusion 712 may allow a sensor or other tool (such as a dynamo) to be raised into an opening 708 to contact a feature (such as the motorized wheel 124) of a mobile drive unit to facilitate testing the feature.

In some embodiments, the base 706 can also include an obstruction 758. The obstruction may be positioned so that, when a pallet 704 is not engaged with the base 706, the obstruction 758 will prevent a mobile drive unit from moving onto the base 706. In some embodiments, the obstruction 758 may be sufficiently sized so that the mobile drive unit will stop upon detecting the obstruction 758 in the path. In some embodiments, the obstruction may alternatively or additionally physically prevent the mobile drive unit from moving onto the base 706 when a pallet 704 is not in place or engaged on the base 706. In a particular embodiment, the obstruction 758 can be a spring-loaded bar that may be pushed out of the way into an indentation 748 in the pallet 704 when the pallet 704 is engaged with the base 706 (e.g., FIG. 10). In some aspects, as may be appreciated with reference to FIGS. 6-7, an obstruction 758 may be positioned near either end of a ramp 502.

Figure 10:
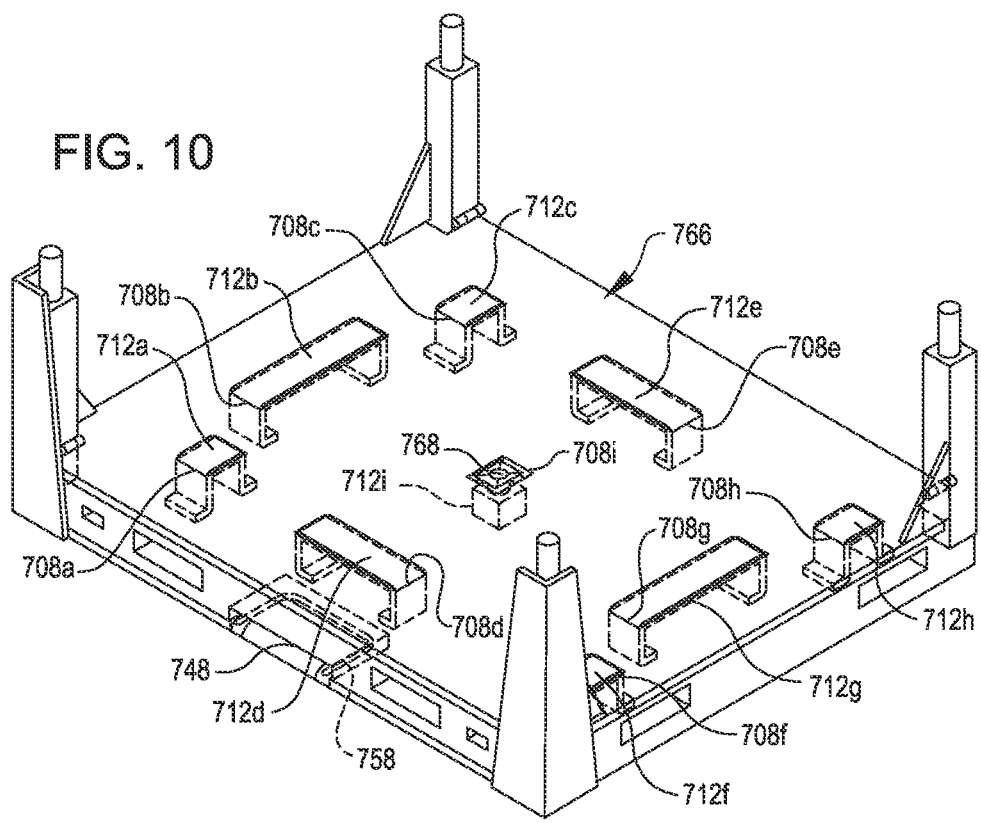
FIG. 10 illustrates the base and pallet of FIG. 9 in an engaged configuration according to a particular embodiment.

FIG. 10 illustrates the pallet 704 and base 706 of FIG. 9 in an engaged configuration. The pallet 704 may be lowered onto the base 706 in order to bring the pallet 704 and the base 706 into engagement. In the engaged configuration, protrusions 712a-712i may extend into the corresponding openings 708a-708i. The protrusions 712 can fill the openings 708 so that the pallet 704 and top surfaces of the protrusions 712 together form a combined surface 766 that is navigable by a mobile drive unit (i.e., so that the mobile drive unit does not get stuck while driving over openings 708 in the pallet 704).

A fiducial marker 768 can be included on a protrusion 712*i* that extends through an opening 708*i* when the pallet 704 is engaged with the base 706. The fiducial marker 768 can be used for navigation by a mobile drive unit in a manner similar to what has been described previously herein. Providing a fiducial marker 768 that remains with the base 768 as opposed to moving away with each pallet 704 can reduce the number of fiducial markers 768 implemented and reduce time or complexity that might otherwise be introduced by incorporating a new fiducial marker into a floor plan with each pallet 704.

Figure 11:
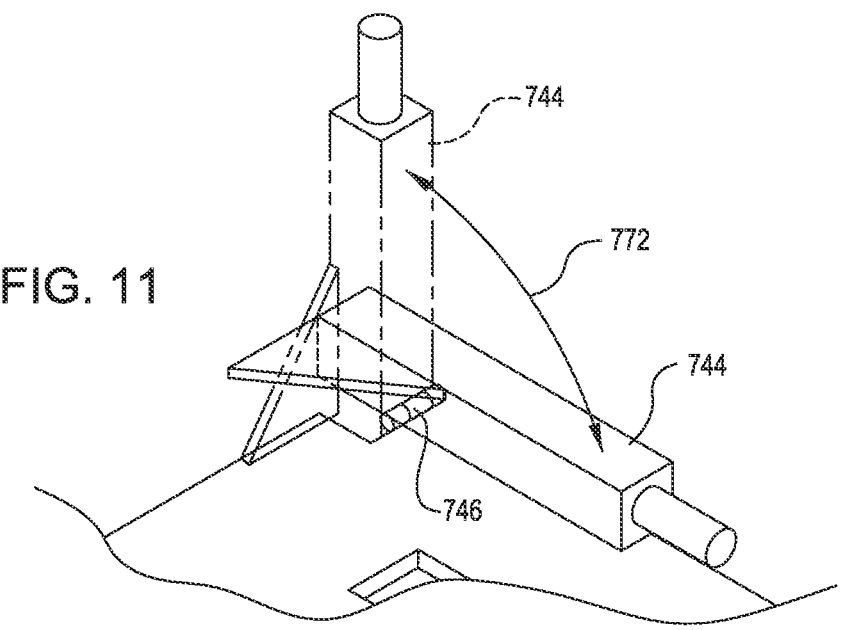
FIG. 11 illustrates in greater detail an example of a post of the pallet of FIGS. 9 and 10 according to a particular embodiment.

FIG. 11 illustrates in greater detail an example of a post 744 of the pallet 704. The post 744 may be movable between an upright supporting position (dashed lines) and a storage position (solid lines), as illustrated by arrow 772. The post 744 may include a hinge 746 or other mechanism to facilitate this movement.

Figure 12:
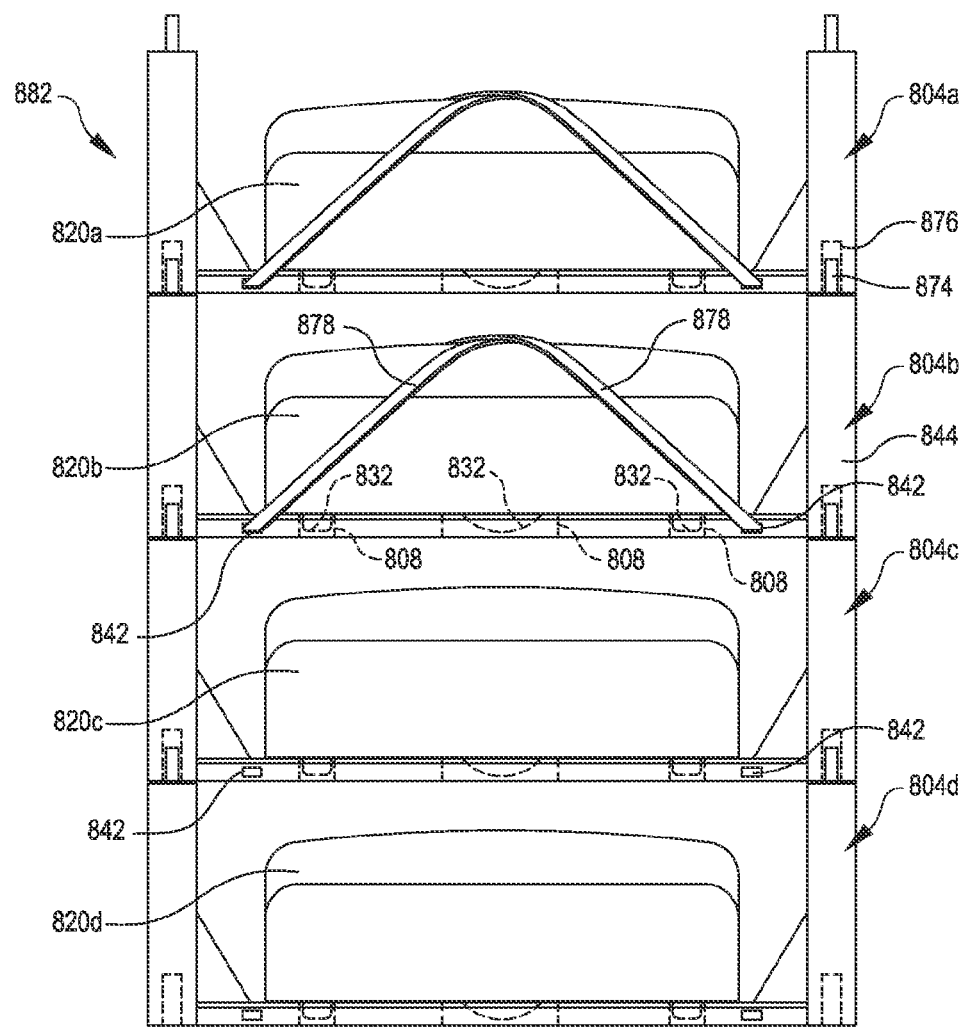
FIG. 12 illustrates an example of stacked pallets supporting mobile drive units according to a particular embodiment.

FIG. 12 illustrates a stack 882 of pallets 804*a-d* containing mobile drive units 820*a-d* in accordance with a particular embodiment. The stack 882 may include pallets 804*a-d* arranged such that features 832 of any particular mobile drive unit 820*b* extend into openings 808 of a corresponding pallet 804*b*. The pallet 804*b* may include posts 844 with features for supporting another pallet 804*a*. For example, the posts 844 can include a male connector 874 for engaging a female connector 876 of a second pallet 804*a*.

Belts or other forms of restraints 878 can be passed over the mobile drive unit 820*b* so as to further secure the mobile drive unit 820*b* in place relative to the pallet 804*b*. In some embodiments, the restraints 878 may latch and/or otherwise engage into recesses 842 in the pallet 804*b* to secure ends of the restraints 878 in place. In some aspects, the restraints may be retractable into the recesses 842 for storage when not in use to retain a mobile drive unit 820*c*.

Figure 13:
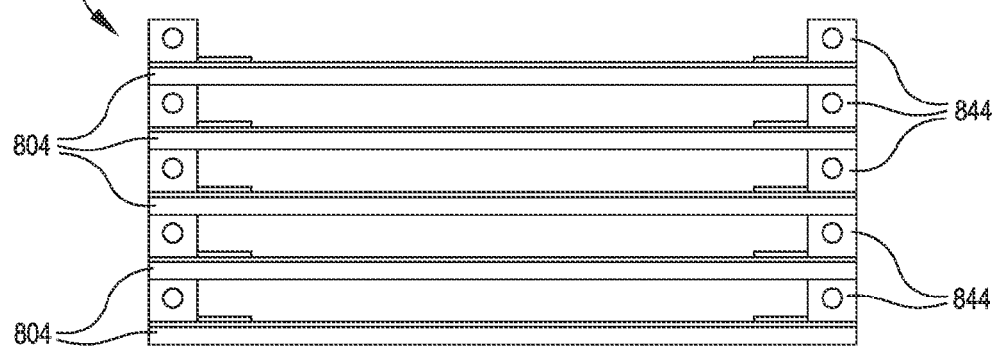
FIG. 13 illustrates stacked pallets without mobile drive units according to a particular embodiment.

FIG. 13 illustrates a stack of pallets 804 without mobile drive units 820. As described above with respect to FIG. 11, posts 844 of the pallet 804 can be adjusted from an upright supporting position to a storage position. As may be appreciated by comparing FIG. 13 with FIG. 12, arranging the posts in the storage position can allow the pallets 804 to be stacked and shipped together in a stack that takes up less room than when mobile drive units are in place on the pallets 804.

FIG. 14 is a flowchart illustrating a process 900 for "un-palletizing" or unloading mobile drive units from pallets according to a particular embodiment. The process 900 may introduce the mobile drive units into an inventory system, such as after shipping the mobile drive units from another location or constructing and/or testing the mobile drive units on the pallets.

At 905, a base can be installed. For example, the base 506 can be bolted to a floor of a warehouse or other location containing an inventory system 510 (e.g., FIG. 7). A ramp may also be installed with the base. For example, the ramp 502 may also be attached to the floor and/or to the base 506 (e.g., FIG. 7). Any suitable form of attachment may be used, including but not limited to, bolting, welding, gluing, stapling, magnetic coupling and snapping. In some embodiments, the base and/or ramp may be installed to be permanent fixtures in the inventory system. In other embodiments, the ramp and/or base are installed so as to be removable to facilitate use of the ramp and base in another area of the warehouse or another location apart from the warehouse.

At 910, a pallet can be obtained. For example, a forklift 533 (e.g., FIG. 6) can lift a pallet 804 from a stack 882 in which the pallet 804 was shipped (e.g., FIG. 12). The forklift 533 can move the pallet towards the base (e.g., pallet 504 toward base 506 in FIG. 6).

At 915, the pallet can be aligned with the base. For example, with reference to FIG. 9, a forklift operator may move the pallet 704 forward until posts 744 and/or a front edge of the pallet 704 encounter a portion of the guide 756. Aligning the pallet 704 with the guide 756 can increase the likelihood that protrusions 712 of the base 706 will align correctly with the openings 708 on the pallet 704.

At 920, the pallet can be engaged with the base. For example, the protrusions 712 can be introduced into the openings 708 (e.g., FIG. 9-10). In the illustrated example of FIGS. 6 and 7, engaging the pallet 504 with the base 506 may be accomplished by lowering the pallet 504 onto the base 506. However, in some embodiments the base 506 may be raised into the pallet 504, or one or more of the protrusions 512 of the base 506 can be actuated to engage the openings 508. Regardless, engaging the pallet 504 with the base 506 can push features 532 of the mobile drive 520 unit out of the openings 508 in the pallet 504 to permit the mobile drive unit 520 to navigate upon the pallet 504.

At 925, restraints can be released. For example, with reference to FIG. 12, releasing the restraints 878 can allow the mobile drive unit 820*b* to vertically displace relative to the pallet 804*b*. As may be appreciated with reference to FIGS. 6-7, such vertical displacement of a mobile drive unit 520 may permit features 532 to be displaced from openings 508 in response to protrusions 512 entering the openings 508 during engagement of the pallet 504 with the base 506. In some aspects, the restraints 878 may be released while the pallet 804*b* is still in or on a stack 882 (e.g., FIG. 12) or is on a forklift and not yet engaged with a pallet (e.g., pallet 704 of FIG. 9). Releasing the restraints 878 at such times may improve safety and/or ergonomics of the process 900 for a human operator by reducing a number of instances that the operator is bending over to reach the restraints 878.

At 930, the mobile drive unit can be powered on. For example, with reference to FIG. 1, powering on the mobile drive unit 20 may allow a management module 15 to communicate with the drive unit 20 so as to provide task assignments 18.

At 935, the mobile drive unit can be instructed to move from the pallet that is engaged with the base. As an illustrative example, the management module 15 (e.g., FIG. 1) may provide a task assignment 18 instructing the mobile drive unit 520 (e.g., FIG. 7) to drive down the ramp 502 en route to another destination within the inventory system 10 (e.g., FIG. 1). The mobile drive unit may recognize a fiducial 768 (e.g., FIG. 10) visible through an opening 708 in the pallet 704. The mobile drive unit may use the fiducial 768 for navigation. In some embodiments, an operator may provide a command to the mobile drive unit to move off of the pallet 504 before connecting the mobile drive unit to the management module 15 and/or may provide the appropriate initiation to bring the mobile drive unit into communication with the management module 15. Alternatively, in some embodiments, a person can physically push the mobile drive unit 520 off of the pallet 504 via the ramp 502, such as if an inoperable component of the mobile drive unit 520 renders providing a task assignment 18 to the mobile drive unit 520 impractical.

At 940, the pallet can be disengaged from the base. For example, with reference to FIGS. 6-7, the forklift 533 can lift the now-empty pallet 504 from the base 506 so that the protrusions 512 are no longer engaged with the openings 508.

In some embodiments, the protrusions 512 may be retracted from the openings 508 to disengage the pallet 506 and base 504 without lifting the pallet 504 or necessarily removing the pallet from the base 506.

At 945, the pallet can be removed from the base. For example, with reference to FIG. 9, the now-empty pallet 704 may be lifted from the base 706 until the posts 744 are clear of the guides 756 and/or until no part of the pallet 704 remains in contact with any part of the base 706. The removed pallet may be moved to an area where empty pallets are being stored.

At 950, the pallet can be stored. For example, posts 844 may be moved into a stored position, and the pallet 804 may be placed in a condensed stack 882 (e.g., FIG. 13). In some embodiments, the posts 844 be kept in an upright supporting position when stored (e.g., FIG. 13 without mobile drive units 804).

In embodiments, operations 910 through 950 may be repeated to introduce multiple mobile drive units 520 from multiple pallets 504 into an inventory system 510 using a single base 506. In some embodiments, multiple bases 506 may be used in order to expedite an unloading process. Upon unloading a desired number of mobile drive units, at operation 955 the base can be removed. For example, the base 506 can be unbolted or otherwise detached from the floor. The ramp 502 may also be removed, if utilized. The removed base 506 and ramp 502 can be stored with the pallets 504 for subsequent use when palletizing, shipping, storing, testing and/or unpalletizing other mobile drive units.

FIG. 15 is a flowchart illustrating a process 1000 for "palletizing" or loading mobile drive units onto pallets according to a particular embodiment. In some embodiments, the mobile drive units can be palletized to prepare the mobile drive units for storage or shipment from one location to another. In some embodiments, the mobile drive units can be palletized in order to facilitate testing of the functionality of the mobile drive unit prior to implementation or shipping of the mobile drive unit.

At 1005, a base can be installed. For example, the base 506 depicted in FIG. 6 can be installed. The installation process can be similar to that described above with respect to operation 905.

At 1010, an empty pallet can be obtained. For example, the empty pallet can be obtained in a similar manner to that described with regard to operation 910 described above. A pallet 804 may be obtained from a stack 882 of pallets 804 having posts 844 in a stored position (e.g., FIG. 13). Posts 744 of the pallet 704 may be moved to an upright supporting position (e.g., to the position shown in dashed lines in FIG. 11) to prepare the pallet to receive a mobile drive unit.

At 1015 and 1020, the empty pallet can be respectively aligned with the base and engaged with the base. These operations may be performed in manners similar to those described with regard to operations 915 and 920 described above. Regardless, engaging the empty pallet 704 with the base 706 can provide a combined surface 766 navigable by a mobile drive unit (e.g., FIG. 10).

At 1023, an indication may be provided that the empty pallet is in place. For example, the operator of the forklift may provide the indication via a user interface 580 (e.g., FIG. 7). The user interface 580 may include a touchscreen or other input device mounted to the forklift or otherwise accessible to the operator of the forklift or another individual involved in the process 1000. The user interface 580 may communicate with the management module 15 or other parts of the inventory system 110. In some embodiments, the pallet 504 or base 506 can include components that will automatically communicate with the management module 15 that the pallet 504 is in place. For example the pallet may include an RFID tag and the base 506 may include an RFID reader or vice versa. Other alternatives include pressure-sensitive sensors to indicate that a pallet is in place in response to the weight of the pallet being detected by the sensor.

At 1025, a mobile drive unit can be instructed to move onto the pallet. For example, in response to the indication that the pallet is in place, the management module 15 may provide a task assignment 18 to a mobile drive unit 20 to move to a fiducial 768 associated with the base 706 and/or pallet 704 (e.g., FIGS. 1 & 10). In some embodiments, a mobile drive unit 520 (e.g., FIG. 7) may be instructed to move onto the pallet 504 by a technician providing instructions to the mobile drive unit through an interface other than the management module 15. Alternatively, in some embodiments, a person can physically push the mobile drive unit 520 onto the pallet 504 via the ramp 502, such as if an inoperable component of the mobile drive unit 520 renders providing a task assignment 18 to the mobile drive unit 520 impractical.

At 1030, the pallet, now supporting the mobile drive unit, can be disengaged from the base. For example, the pallet 504 may be disengaged from the base 506 in any of the manners described above with respect to operation 940. Disengaging the pallet 504 from the base 506 may allow features 532 of the drive unit to nest into the openings 508 of the pallet 504 that are no longer occupied by the protrusions 512 of the base 506.

At 1035, the pallet can be removed from the base. For example, the pallet 704 may be removed from the base 706 in any of the manners described above with respect to operation 945. The pallet 704 may be moved to an area in which the pallet 704 will not be obstructing access to the base 706 by another pallet 704.

At 1040, restraints may be connected to the mobile drive unit and/or pallet. For example, the restraints 878 may be placed over the drive unit 820b and connected in recesses 842 in the pallet 804b (e.g., FIG. 12). Connecting the restraints 878 may prevent the mobile drive unit 820b from becoming jostled loose from the pallet 804b during shipping or other operations.

At 1045, the mobile drive unit can be powered down. For example, an operator—such as the forklift operator or another technician—can power down the mobile drive unit 520 while it is on the pallet 504 (e.g., FIG. 6). In a particular embodiment, the mobile drive unit 520 may be powered down after being lifted from the base 506 so that an operator need not bend down to power down the mobile drive unit 520. The operator may safely power down the mobile drive unit 520 in such an embodiment because the features 532 that would allow the mobile drive unit 520 to move are extended in the openings 508 of the pallet 504, thus preventing the mobile drive unit 520 from moving from the pallet 504 and/or endangering the operator.

At 1050, the pallet carrying the drive unit can be stored and/or shipped. For example, with reference to FIG. 12, the pallet 804b with a mobile drive unit 820b may be stacked in a stack 882 on top of and/or underneath other pallets 804a, 804c, 804d containing mobile drive units 820a, 820c, 820d.

In embodiments, operations 1010 through 1050 may be repeated to palletize and/or load multiple drive units 520 on multiple pallets 504 using a single base 506. In some embodiments multiple bases 506 may be used in order to expedite a loading process. Although a single base 506 may be used for a single pallet 504, using a single base 506 for multiple pallets 504 can reduce a number of bases 506 to be fabricated or shipped in order to accomplish a particular loading, unloading, palletizing, or unpalletizing process. Upon loading or unloading a desired number of mobile drive units, at 1055, the base or bases 506 can be removed. For example, the base may be removed in any of the ways described above with respect to operation 955. Removing the base 506 may facilitate transporting the base 506 to another location where mobile drive units 520 are to be palletized, shipped, stored, tested and/or unpalletized.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
    a mobile drive unit comprising a body having a bottom surface and a plurality of features extending below the bottom surface;
    a base comprising a plurality of protrusions; and
    a pallet comprising a support surface and a plurality of openings extending through the support surface, the plurality of openings arranged such that, (1) in an engaged configuration, the plurality of protrusions on the base project into the plurality of openings in the pallet such that the plurality of protrusions and the support surface together form a combined surface navigable by the mobile drive unit, and (2) in a separate configuration, when the base is disengaged from the pallet so that the protrusions are no longer within the openings and the mobile drive unit is positioned on the pallet, the plurality of features of the mobile drive unit are positioned within the plurality of openings.

2. The inventory system of claim 1, wherein the plurality of features comprises at least one of a wheel, a caster, an axle, or a yoke.

3. The inventory system of claim 1, wherein the pallet further comprises one or more restraints arranged to secure the mobile drive unit to the pallet in the separate configuration.

4. The inventory system of claim 1, further comprising a ramp configured to provide a path from a floor upon which the base is installed to the combined surface.

5. The inventory system of claim 1, further comprising:
    an obstruction configured to block a path of the mobile drive unit to the base when the base is not engaged with the pallet.

6. The inventory system of claim 1, wherein at least one of the plurality of protrusions of the base includes a fiducial marker readable by the mobile drive unit.

7. The inventory system of claim 1, wherein the pallet comprises a first pallet having a set of posts arranged for supporting a second pallet relative to the first pallet when the first pallet is in the separate configuration.

8. The inventory system of claim 7, wherein the set of posts are foldable such that the pallet occupies a smaller volume in an empty configuration in which the pallet is not supporting a mobile drive unit than in a loaded configuration in which the pallet is supporting a mobile drive unit.

9. The inventory system of claim 1, further comprising a management module configured to:
    receive an indication that the pallet is in the engaged configuration; and
    instruct the mobile drive unit to drive onto the combined surface of the pallet and the base.

10. The inventory system of claim 1, wherein the pallet further comprises a metal frame, and wherein the support surface of the pallet comprises a wooden layer coupled with the metal frame.

11. A method comprising:
    engaging a pallet with a base so that a protrusion of the base is positioned within a corresponding opening of the pallet;
    positioning a mobile drive unit on the pallet so that a feature of the mobile drive unit is positioned over the protrusion that is positioned in the corresponding opening of the pallet; and
    disengaging from the corresponding opening the protrusion over which said feature of the mobile drive unit is positioned so as to position said feature within the opening.

12. The method of claim 11, further comprising:
    providing an indication that the pallet is engaged with the base, wherein the positioning the mobile drive unit on the pallet includes instructing the mobile drive unit to drive onto the pallet in response to the indication that the pallet is engaged with the base.

13. The method of claim 11, wherein the disengaging comprises lifting the pallet with respect to the base.

14. The method of claim 11, further comprising:
stacking the disengaged pallet on a second pallet, wherein the second pallet is supporting a second mobile drive unit such that a feature of the second mobile drive unit is positioned in a corresponding opening of the second pallet.

15. The method of claim 11, further comprising:
performing testing associated with a characteristic of the feature positioned within the opening.

16. A method comprising:
supporting a mobile drive unit on a pallet such that a feature of the mobile drive unit is positioned within a corresponding opening of the pallet; and
engaging the pallet with a base so as to position a protrusion of the base within said opening of the pallet and move said feature out of the opening.

17. The method of claim 16, further comprising:
communicating information about the mobile drive unit to a management module.

18. The method of claim 16, further comprising:
releasing restraints securing the mobile drive unit to the pallet.

19. The method of claim 16, further comprising:
instructing the mobile drive unit to drive off the pallet.

20. The method of claim 16, further comprising:
installing the base to a floor in an inventory system; and
removing the base from the floor.

* * * * *